United States Patent [19]
Pruitt et al.

[11] Patent Number: 5,345,752
[45] Date of Patent: Sep. 13, 1994

[54] IMPELLER PLATES FOR ROTARY CUTTING UNITS OF A CROP HARVESTER

[75] Inventors: Martin E. Pruitt, Hesston; Cecil L. Case; H. Keith Garrison, both of Newton, all of Kans.

[73] Assignee: Hay & Forage Industries, Hesston, Kans.

[21] Appl. No.: 62,805

[22] Filed: May 11, 1993

Related U.S. Application Data

[62] Division of Ser. No. 868,532, Apr. 14, 1992, Pat. No. 5,272,859.

[51] Int. Cl.⁵ .............................................. A01D 34/82
[52] U.S. Cl. ............................................ 56/6; 56/13.6; 56/DIG. 20; 56/DIG. 24
[58] Field of Search .................. 56/6, 13.6, 15.1, 15.2, 56/15.6, 15.7, 255, 295, DIG. 17, DIG. 20, DIG. 24

[56] References Cited

U.S. PATENT DOCUMENTS

| | | | |
|---|---|---|---|
| 4,166,350 | 9/1979 | Werner | 56/13.6 X |
| 4,531,349 | 7/1985 | Ehrhart et al. | 56/6 X |
| 4,567,716 | 2/1986 | Makofka et al. | 56/295 X |
| 4,909,023 | 3/1990 | Haberkorn et al. | 56/6 X |

Primary Examiner—Terry Lee Melius
Attorney, Agent, or Firm—Hovey, Williams, Timmons & Collins

[57] ABSTRACT

The harvester has a transverse cutter bed provided with a series of rotary cutting units that rotate about individual upright axes. Those cutting units located outboard of the discharge opening behind the cutting bed are provided with specially configured impeller plates that assist in the proper delivery of cut materials into the opening.

3 Claims, 4 Drawing Sheets

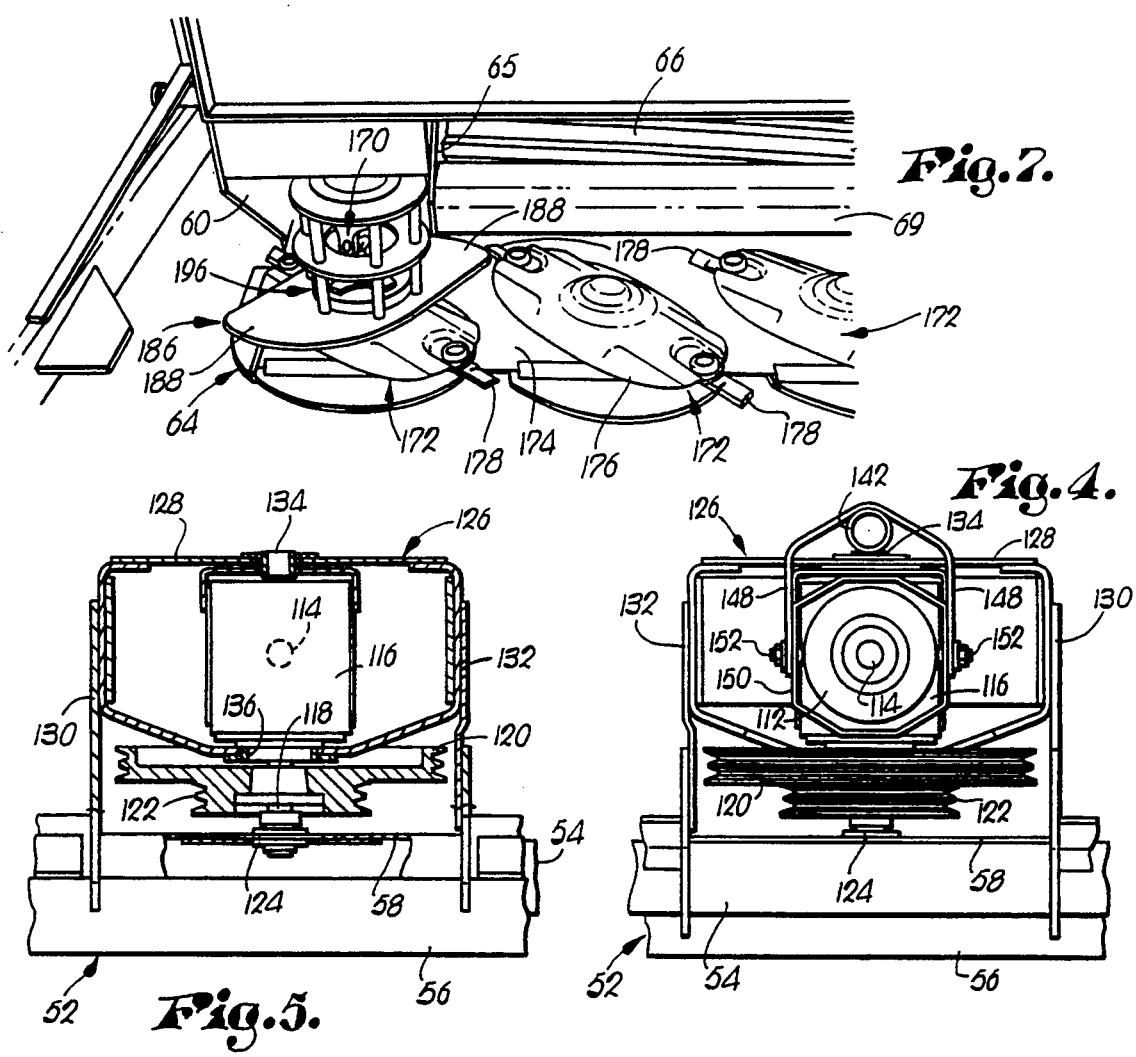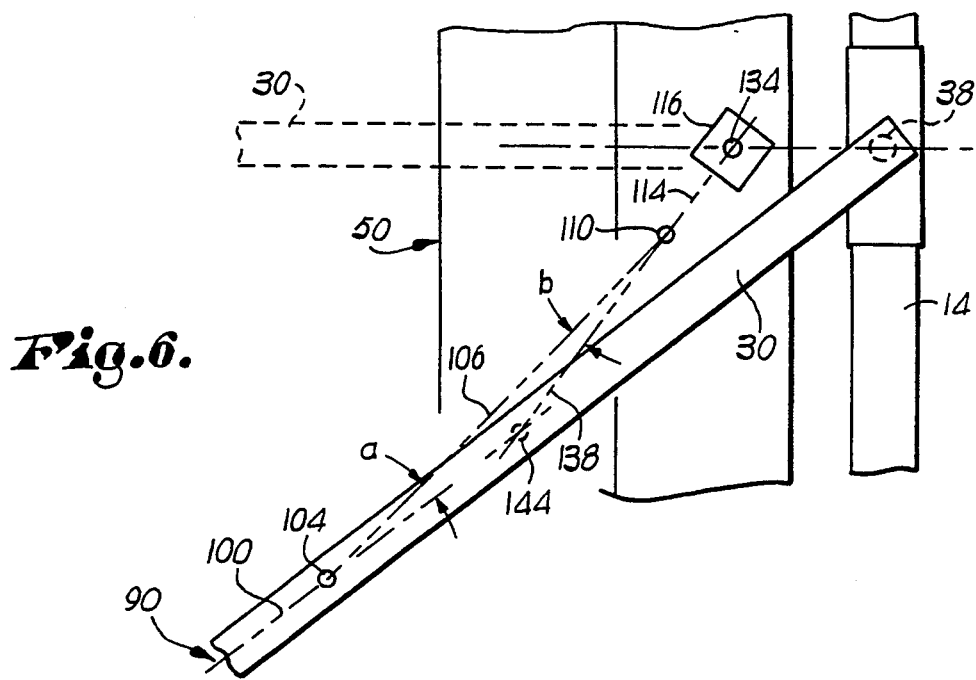

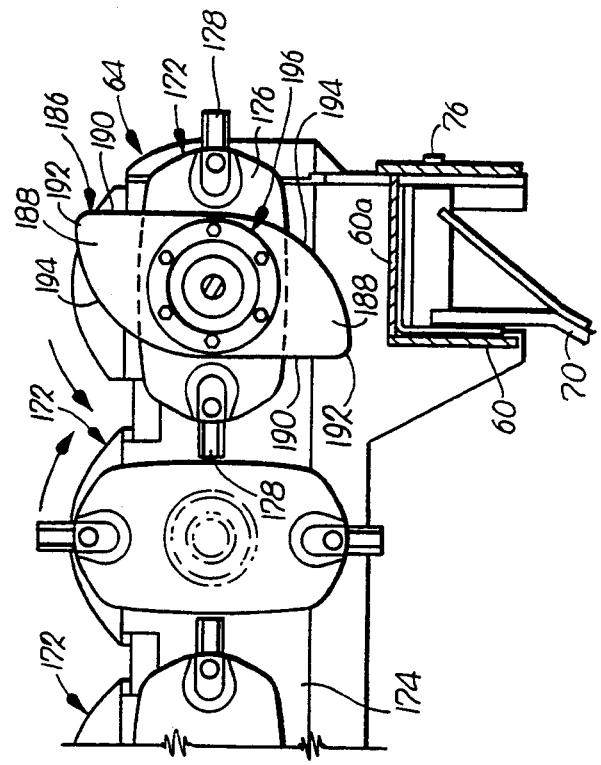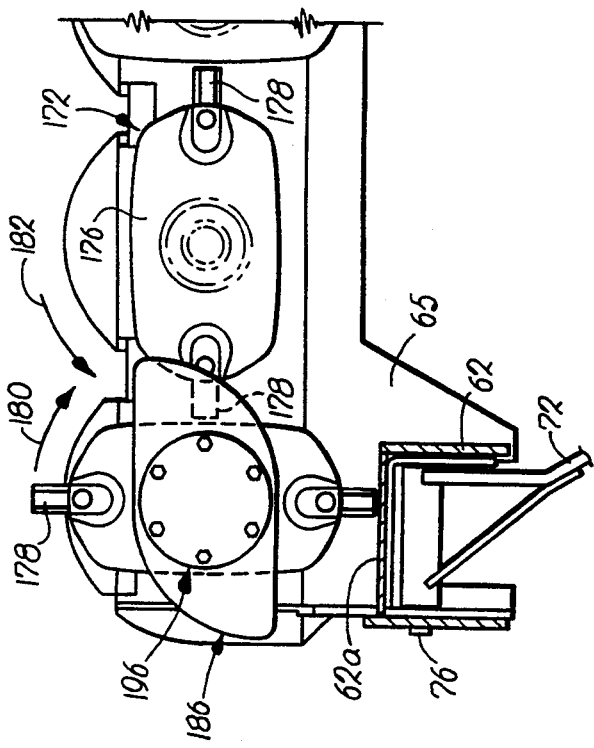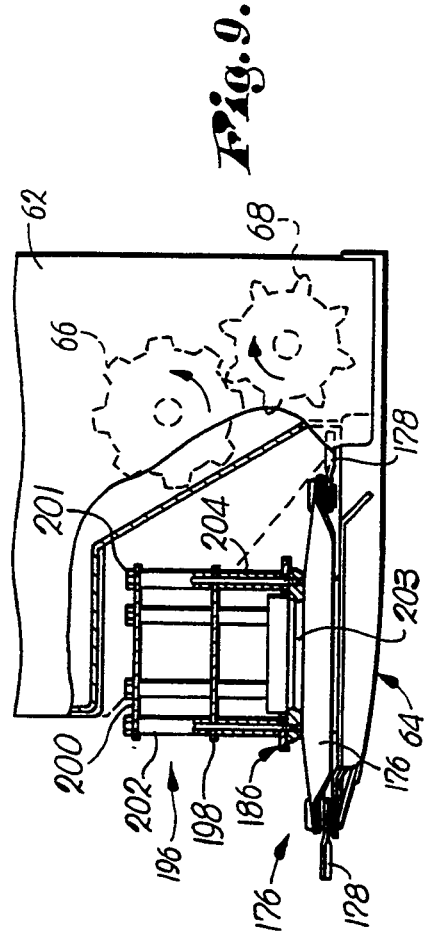

IMPELLER PLATES FOR ROTARY CUTTING UNITS OF A CROP HARVESTER

This is a division of application Ser. No. 07/868,532, filed on Apr. 14, 1992, now U.S. Pat. No. 5,272,859.

TECHNICAL FIELD

This invention relates to crop harvesting equipment and, more particularly, to pull-type mowers or mower/-conditioners having a pulling tongue which is hydraulically swingable from side-to-side as the machine is being advanced across a field so that the lateral position of the machine relative to the towing tractor can be adjusted on-the-go from the tractor seat. More particularly, the present invention involves a swing tongue harvester of the aforementioned type wherein provision is made for driving the operating components of the harvesting header, such as the crop severing mechanism and the conditioner rolls, through mechanical means coupled with the power takeoff shaft of the towing vehicle, rather than through a hydraulic drive system.

BACKGROUND

Swing-tongue harvesters have become extremely popular over the years due in part to their ability to be quickly and easily maneuvered from the tractor seat around obstacles, through right angle turns, and otherwise operated in a manner previously reserved only for self-propelled vehicles. In the case of "center-pivot" swing-tongue harvesters in which the tongue is pivoted at or near the transverse center of the machine, the machine is capable of being used to cut back and forth across a field in subsequent passes as it is shifted first to the right during one pass and then out to the left on the return pass.

Having a pulling tongue which is shifted between relatively sharp angular positions, however, creates problems in the delivery of driving power from the tractor to operating components of the machine. One way to accomplish such power delivery is through the use of a remote hydraulic motor back on the machine which is coupled with the tractor hydraulics in such a way that hydraulic power is supplied to the motor through long flexible lines leading from the tractor back to the motor. By positioning the hydraulic motor back on the harvester itself, there is no need to have mechanical drive lines extending between the tractor and the harvester which would become subjected to the ongoing angular movements and turns between the harvester and the tractor. The hydraulic hoses can instead flex to the extent necessary to accomplish such angulations, and it is only necessary to have a mechanical drive line system leading from the hydraulic motor down to the components to be driven.

However, a hydraulic drive system of this type is expensive and has certain power limitations, as well as other problems. Therefore, it would still be desirable, if possible, to have a mechanical drive line between the tractor and the harvester which could supply all of the power needs of the harvester and yet fully withstand the twists and turns and angular motions effected by the harvester as it is used and maneuvered in its most efficient manner.

SUMMARY OF THE INVENTION

Accordingly, one important object of the present invention is to provide a mechanical drive, swing-tongue harvester in which the operating components of the harvesting header are powered by a mechanical drive line connected to the power takeoff shaft of the towing vehicle.

Pursuant to this object, the present invention utilizes a right angle gear box on the harvesting header into which driving power is supplied and out of which driving power is distributed to the operating components via belt and pulley arrangements. The output shaft of the gearbox projects downwardly from the bottom of the gearbox to define an upright axis about which the gearbox can be swiveled, such axis being spaced forwardly from the axis of the swing-tongue which is located back on the main frame of the machine. The drive line from the power takeoff shaft of the tractor extends along the tongue and is supported in underslung relationship thereto so that the rear end of the drive line is coupled with the input shaft of the gearbox which extends fore-and-aft. When the tongue is swung back and forth to reposition the harvesting portion of the machine, a telescoping section of the drive line between a supporting point on the tongue and the connection with the gearbox telescopically extends and retracts to accommodate the different axes of rotation of the tongue and the gearbox. A telescoping steering linkage connected between the tongue and the gearbox has the effect of steering the gearbox as the tongue is swung such that loading is relieved from the drive line. The anchor point of the steering linkage to the tongue is approximately equidistantly spaced from opposite ends of the telescoping section of the drive line so that substantially equal angles are presented at opposite ends of the drive line regardless of the swing angle of the tongue, hence reducing the torsional loading otherwise experienced by the drive line at the opposite ends of the telescoping section due to unequal angular relationships at those locations.

In the event that the inventive concepts are utilized in connection with a rotary mower in which a series of high speed, rotary cutting units are utilized instead of a straight, reciprocable sickle assembly, the present invention also contemplates improvements in feeding the cut crop rearwardly into the opening for the conditioner rolls, particularly at the cutter units at the opposite ends of the cutter bed. In this respect, it has been found that cut crop at the endmost units has a tendency to be flung rearwardly on around and thence laterally outwardly through the open end of the cutter bed instead of rearwardly into the conditioner roll opening. However, in accordance with the present invention, an impeller plate is mounted directly above the knife carrier of at least one of the end units and is of such configuration as to contact the flow of cut crop material once it has been severed by the outboard cutter unit and to force such material to flow rearwardly and inwardly into the discharge opening in the intended manner.

BRIEF DESCRIPTION OF THE DRAWINGS

FIG. 3 is a fragmentary, left side elevational view of the top portion of the harvesting header in the vicinity of the right angle gearbox and steering linkage;

FIG. 4 is an enlarged, fragmentary front elevational view of the gearbox of the harvesting header with the drive line and clutch removed to reveal details of construction;

FIG. 5 is a transverse cross-sectional view of the gearbox area taken substantially along line 5—5 of FIG. 2;

FIG. 6 is a fragmentary, top schematic plan view of the harvester in its FIG. 1 position illustrating the geometric relationships between the various pivot points and connection points of the tongue, gearbox, drive line, and steering linkage which enables the telescopic section of the drive line to maintain substantially equal drive angles at its opposite ends in all positions of swinging movement of the tongue;

FIG. 7 is a top, front, fragmentary perspective view of the right end portion of the cutter bed of the harvesting header showing the use of a feeding impeller on the endmost cutter unit in accordance with the principles of the present invention;

FIG. 8 is a somewhat schematic, fragmentary top plan view of the cutter bed illustrating the relationship between the feeding impellers of the two endmost cutter units and adjacent structure and mechanism; and FIG. 9 is a fragmentary, left end elevational view of the cuter bed.

DETAILED DESCRIPTION

Figure 1:
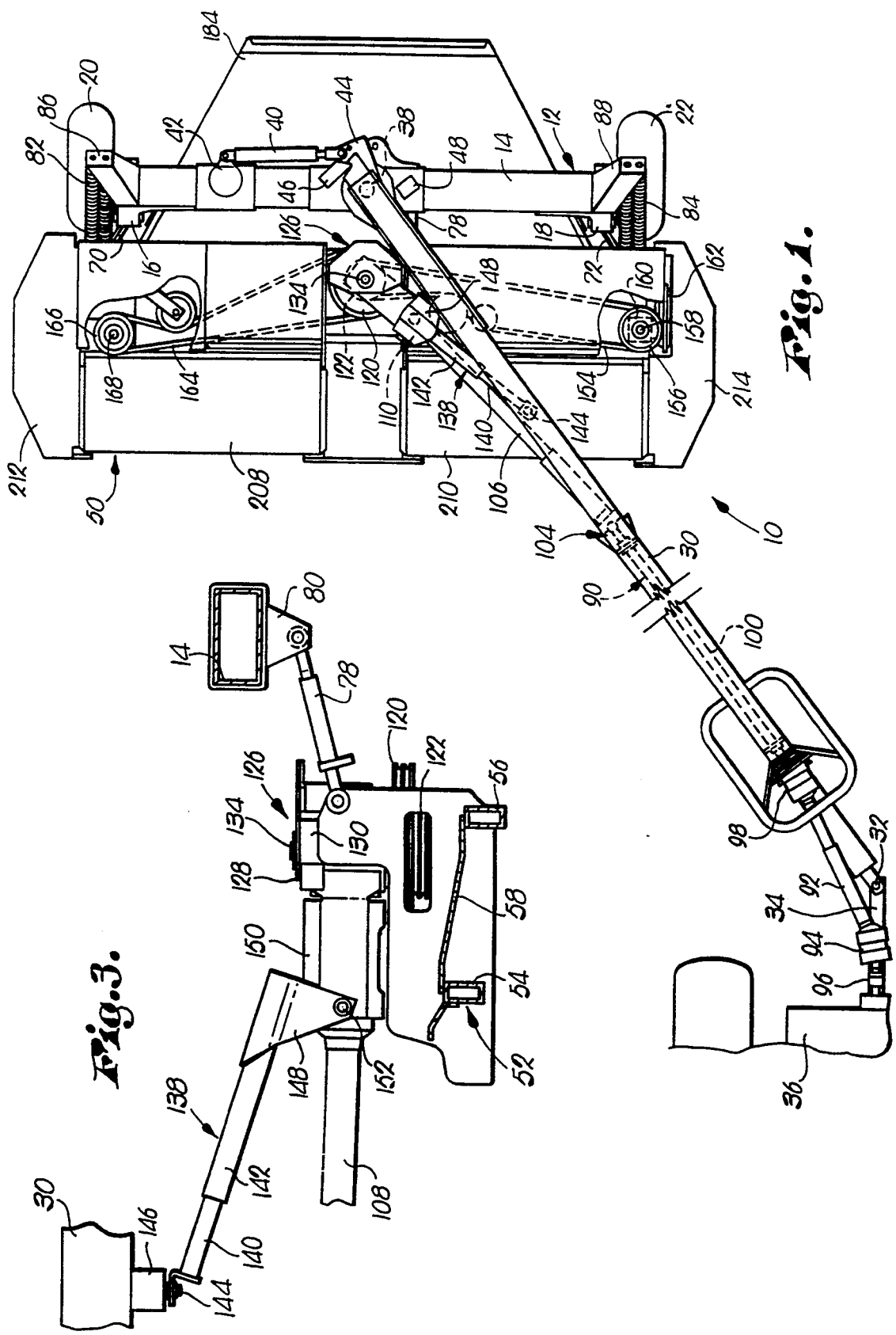
FIG. 1 is a top plan view of a swing-tongue harvester constructed in accordance with the principles of the present invention showing the harvesting portion of the machine shifted out to the right hand side of the towing tractor so that the pull-tongue is in its left-most, angular position, parts being broken away to reveal details of construction.

The harvester 10 includes an inverted, generally U-shaped mobile frame 12 having an upper cross beam 14 and a pair of depending legs 16 and 18 at opposite ends of the beam 14. A pair of ground wheels 20 and 22 are connected to the lower ends of the legs 16, 18, respectively, via respective fore-and-aft wheel arms 24, only one of such arms 24 being visible in the drawings (see FIG. 2). Each of the wheel arms 24 has a transverse, pivot connection 26 at its forward end with the lower end of the respective leg 16 or 18, and each wheel arm 24 is swung about such pivot connection 26 by its own hydraulic cylinder 28 so that the frame 12 is effectively raised and lowered by extending and retracting the cylinders 28, respectively.

The frame 12 is adapted for towing movement through a long fore-and-aft tongue 30 having a hitch 32 at its front end for pivotal connection to the draw bar 34 of a towing tractor 36. At its rear end, the tongue 30 is journaled on a vertical pivot post 38 which is fixed to the cross beam 14 of the frame 12 substantially centrally between its two opposite ends. The pivot post 38 thus defines a first upright pivot axis. Although the tongue 30 is shown in FIG. 1 in its position of leftmost swinging movement, it is to be understood that it can be swung about the pivot 38 to an infinite number of angular positions with respect to the path of travel of the harvester 10, including a centered position as illustrated in phantom lines in FIG. 6 and a full rightmost position which is not illustrated but is the mirror image of the leftmost position in FIG. 1. In order to effect such swinging of the tongue 30 from the driver's seat of the tractor 36, the harvester 10 is provided with a hydraulic swing cylinder 40 which lies along the backside of the cross beam 14 and is connected between a mounting lug 42 on the cross beam 14 (FIG. 1) and a short crank 44 projecting rigidly rearwardly from the tongue 30 behind the pivot 38. A pair of stops 46 and 48 on the cross beam 14 are located on opposite lateral sides of the pivot 38 in position to abuttingly engage the crank 44 so as to define mechanical limits of swinging motion of the tongue 30.

Supported by the frame 12 beneath the swing tongue 30 is a harvesting header broadly denoted by the numeral 50. In accordance with the principles of the present invention, the header 50 may be constructed in a number of different ways to perform a number of different functions. In the illustrated embodiment, the header 50 is designed to both mow or cut the standing crop and condition the crop before returning the cut crop to the ground in a windrowed or swathed condition. It will be understood, however, that the principles of the present invention are not limited to a machine which both mows and condition the crop, i.e., to a mower/conditioner.

The header 50 has a frame of its own which can be described as being of generally open, box-like construction in a rectangular configuration. Such frame is broadly denoted by the numeral 52 in FIG. 2 and includes a pair of upper transverse beams 54 and 56. A plate 58 interconnects the beams 54 and 56 near the center of the header 50. A pair of upright, left and right bulkheads 60 and 62 (see FIGS. 2, 7, 8, and 9) are located at opposite ends of the frame 52 and depend from the beams 54, 56 and plate 58. The lower ends of the bulkheads 60, 62 are interconnected by a forwardly offset, transverse cutter bed broadly denoted by the numeral 64 such that the frame 52 is closed at the tops bottom, and sides, but is open in the middle, between the bulkheads 60,62, to present a generally rectangular crop discharge opening broadly denoted by the numeral 65 in FIG. 8, and also shown in FIG. 7. A pair of transverse, cooperating conditioner rolls 66 and 68 (FIGS. 2, 7, and 9) span the discharge opening 65 in stacked relationship to one another and are supported at their opposite ends by the bulkheads 60 and 62 for receiving cut material from the cutter bed 64 and crimping or conditioning the materials before they are returned to the ground. Viewing FIG. 2 it will been seen that the upper conditioner roll 66 is driven in a counterclockwise direction while the lower conditioner roll 68 is driven in a clockwise direction. The rolls 66 and 68 may take a variety of different configurations, as well understood by those skilled in the art and form no part of the present invention, per se. An elongated, overhead baffle bar 69 (FIGS. 2 and 7) projects outwardly in front of the opening 65 and above all but the opposite end portions of the cutter bed 64 for assisting in the smooth feeding of severed crop materials to the conditioner rolls 66, 68 from the cutter bed.

The header 50 is supported for up and down swinging movement beneath the tongue 30 by a pair of lower support links 70 and 72 (FIGS. 1, 2, and 8), each of which is pivotally connected at its rear end to a cranked connection point 74 on the corresponding wheel arm 24 and at its front end via a pivotal connection 76 to the header 50. A centrally disposed stabilizing link 78 (FIGS. 1, 2, and 3) pivotally connects the upper rear portion of the header 50 with a depending lug 80 on the cross beam 14 so that the header 50 is supported in a three-point arrangement. Long flotation springs 82 and 84 at opposite ends of the header 50 connect the bulkheads 60 and 62 with corresponding, upwardly and outwardly angled posts 86 and 88 at opposite ends of the cross beam 14. In this manner, the header 50 is floatingly supported for up and down movement relative to the frame 12 beneath the tongue 30 as rises and falls are encountered in the terrain during advancement of the harvester. The links 70, 72, and 78 swing up and down with the header 50 during such movement. For over-the-road travel, the cylinders 28 are extended from their retracted positions of FIG. 2, whereby to cause the wheel arms 24 to swing downwardly and forwardly in counterclockwise directions about the pivots 26, pushing the header 50 forwardly and upwardly with the assistance of the flotation springs 82 and 84.

A mechanical driveline broadly denoted by the numeral 90 extends along and is rotatably supported by the tongue 30 for delivering driving power from the tractor 36 to the operating components of the harvester 10. At the front end of the driveline 90, a relatively short telescoping section 92 has a front constant velocity joint 94 which connects to the power takeoff shaft 96 of the tractor 36, and a rear constant velocity joint 98 that connects with the front end of an intermediate section 100 of the driveline. The constant velocity joints 94 and 98 are commercially available from a number of sources and are well understood by those skilled in the art. The intermediate section 100 is suspended beneath the tongue 30 by suitable hangers such as the hanger 102 shown in FIG. 2.

The intermediate section 100 extends slightly rearwardly beyond the hanger 102 and at its rear end has a standard universal joint 104 with a long telescoping section 106 that is preferably housed within a protective, telescoping shield 108 well understood by those skilled in the art and commonly commercially available in the agricultural machinery industry. A second standard universal joint 110 is provided at the rear end of the telescoping section 106, which U-joint 110 is connected via a combination slip and overrunning clutch 112 to the input shaft 114 of a standard right angle gearbox 116. The standard universal joints 104 and 110 are commercially available from a number of sources and are well understood by those skilled in the art.

The gearbox 116 is not mounted on the tongue 30, but is instead supported by the header 50 in direct frontal alignment with the tongue pivot 38. Although not illustrated in the drawings, it will be understood that within the gearbox 116, a pair of suitable bevel gears are provided to provide a right angle driving connection between the input shaft 114 and an upright, downwardly extending output shaft 118 slightly visible in FIG. 2 and shown in more detail in FIG. 5. The output shaft 118 has a double sheave unit fixed thereto presenting a large sheave 120 and a small diameter sheave 122 immediately therebelow. The sheaves 120 and 122 are used to supply driving power for the operating components on the header 50, as will subsequently be described.

The output shaft 118 passes through the sheaves 120 and 122 and into a suitable bearing 124 in the top plate 58 of header frame 52, as illustrated in FIG. 5. Although the shaft 118 projects from the bottom of the gearbox 116, it does not support the weight of the gearbox 116. Instead, the gearbox 116 is carried by a cradle broadly denoted by the numeral 126 having an open, generally rectangular, rigid, frame loop 128 that has two stiff, upright side brackets 130 and 132 that support the loop 128 on edge and are rigidly fixed at their lower ends to the header frame 52.

While the loop 128 is fixed and stationary relative to the header frame 52, the gearbox 116 is not, and instead can swivel about an upright axis coinciding with the axis of rotation of the output shaft 118. Such swivelling axis is defined for the gearbox 116 by an upper trunnion 134 in the horizontal top portion of the frame loop 128 and by a coaxial, lower trunnion 136 in the lower horizontal part of the frame loop 128. The axis defined by the trunnions 134, 136 thus presents a second, upright pivot axis on the harvester 10, such second axis being located in direct fore-and-aft alignment with the tongue pivot axis 38 and spaced forwardly therefrom.

It is desirable to pivot the gearbox 116 about its pivot axis 134 in response to swinging of the pull-tongue 30 so as to keep the input shaft 114 of the gearbox 116 at least generally aligned with the telescoping section 106 of the driveline 90. For this purpose, the gearbox 116 is provided with steering structure 138 that interconnects the tongue 30 and the gearbox 116 so as to transmit swinging motion of the tongue 30 to the gearbox 116. As shown particularly in FIGS. 2 and 3, the steering structure 138 comprises a tubular, telescopic linkage consisting of an inner section 140 and a concentrically disposed outer section 142. The inner tube 140 has at its forward end a ball and socket swivel connection 144 with a bracket 146 on the underside of the tongue 30. The opposite end of the inner tube 140 is slidingly received within the outer tube 142, which has a pair of laterally spaced apart, downwardly projecting ears 148 that straddle a rigid, tubular housing 150 projecting forwardly from the gearbox 116. The housing 150 protectively encircles the standard universal joint 110, the clutch 112, and the input shaft 114. The lowermost ends of the two ears 148 are provided with aligned, horizontal pivots 152 that connect the ears 148 with the front end of the housing 150. It will be noted that the pivots 152 are aligned horizontally with the universal joint 110 of the driveline 90.

FIG. 6 shows the geometric relationship between the tongue 30, the driveline 90, and the steering structure 138. It will be noted that the connection point 144 of the steering structure to the tongue 30 is approximately equidistantly spaced from both of the U-joints 104 and 110. Thus, regardless of the angular position of the tongue 30, the angle "a" at the U-joint 104 between the telescoping section 106 and the intermediate driveline section 100 is always approximately equal to the angle "b" at the universal joint 110 between the telescopic section 106 and the input shaft 114. As a result of this equal angle relationship at the two universal joints 104 and 110, loading on the driveline is the same at both points such that no untoward torsional forces are introduced into the driveline at those locations.

With reference to FIG. 1, it will be seen that the smaller drive sheave 122 located beneath the gearbox 116 is entrained by an endless, flexible belt 154 that extends over to the left end of the header across the top portion thereof where it entrains a driven sheave 156 fixed to an input shaft 158 of a right angle gearbox 160. The gearbox 160, in turn, is drivingly coupled with an upright chain case 162 which, through sprockets and drive chains not illustrated, is drivingly coupled with the conditioner rolls 66 and 68 for supplying driving power thereto in the direction earlier described.

The larger sheave 120 located immediately below the gearbox 116 is entrained by a second endless, flexible belt 164 that extends over to the right end of the header 50 to entrain a horizontal sheave 166 at that location. An upright driven shaft 168 is fixed to the sheave 166 for rotation thereby and extends downwardly through the header frame 52 to the mower bed 64 for supplying driving power thereto.

Figure 2:
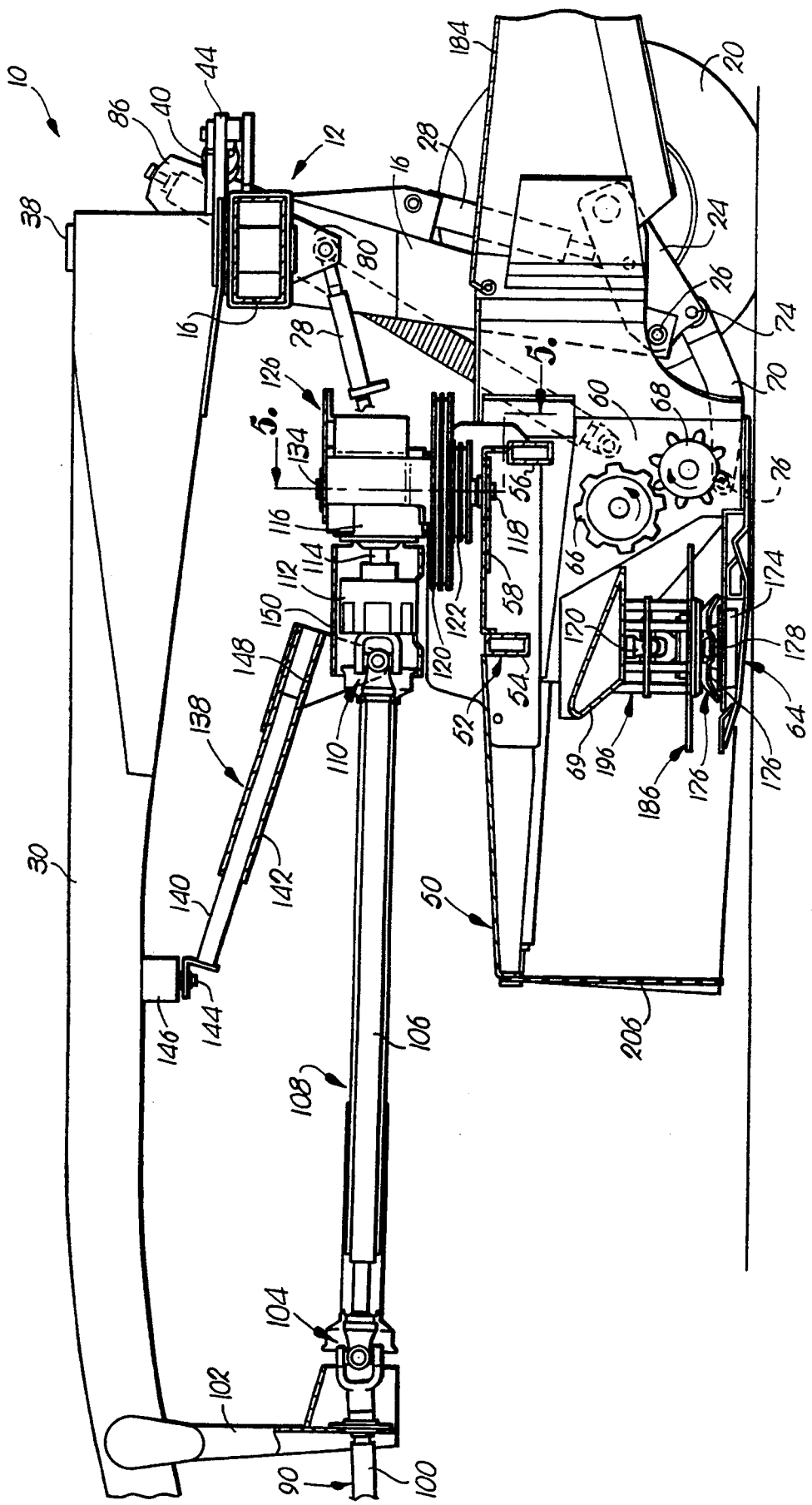
FIG. 2 is an enlarged, fragmentary cross-sectional view of the harvester taken along a line extending fore-and-aft of the machine.

As illustrated in FIGS. 2 and 7, the driven shaft 168 has a universal joint coupling 170 at its lower end with the right endmost cutting unit 172 of the cutter bed 64 for supplying rotary driving power to the unit 172. It will be appreciated that, although not illustrated in the drawings, the cutter unit 172 has a vertical shaft connected to and leading downwardly from the universal joint coupling 170 into a flat, horizontal gear case 174 that extends across the lower front margin of the header 50 and generally forms the lower transverse extremity of the cutter bed 64. Within the gear case 174, a line of intermeshing gears may be provided corresponding in number and position to the number of cutter units 172 disposed in the series across the front of the header and forming part of the cutter bed 64. As an alternative to the intermeshing gears, belts and pulleys or driveshafts with bevel gears may be utilized, although in the preferred embodiment flat, intermeshing spur gears are selected. Details of construction of the gear case 174 and the cutter units 172 are not set forth herein in view of the fact that those skilled in the art are well acquainted with constructional details of cutter beds of the type exemplified by the cutter bed 64.

Suffice it to point out that each of the cutter units 172 includes a generally oval shaped, generally flat, formed metal carrier 176 (for a plan view, see FIG. 8) that has a pair of swingable knives 178 at its opposite longitudinal ends. The knives 178 are pivotally secured to the carrier 176 in the usual manner and project out radially during rotation of the carrier 176.

As is best noted by viewing FIG. 8, the cutter units 172 are spaced along the gear case 174 at such distances that the circular paths of travel described by adjacent carriers in the series overlap one another. Moreover, the adjacent carriers 176 are oriented 90° out of phase to one another so that as the longitudinal axis of one carrier is extending fore-and-aft, the longitudinal axis of the next adjacent carrier is extending side-to-side, and vice versa. The intermeshing gears within the gear case 174 beneath the carriers 176 maintain the cutter units 172 in proper timed relationship with one another.

It will also be seen from FIG. 8 that adjacent cutter units 172 in the series rotate in opposite directions relative to one another about their respective upright axes. Thus, as indicated by the arrows 180 and 182 with respect to the leftmost cutter unit 172 in FIG. 8, successive pairs of the cutter units 172 along the bed 64 cooperate to sever the standing crop engaged by the leading edge of the bed 64 and transfer it rearwardly over the top of the bed 64 and into the opening 65 for engagement by the conditioner rolls 66 and 68. From the conditioner rolls 66 and 68, the cut crop is thrown rearwardly to deflector shields 184, as shown in FIGS. 1 and 2, which deflect the crop and direct it downwardly onto the ground.

The cutter units 172 at the left and right ends of the bed 64 may experience more difficulty in delivering the cut materials rearwardly into the opening 65 than the other cutter units 172. This is due, in part, to the fact that the opening 65 to the conditioner rolls 66,68 is narrower than the cutter bed 64 is long. As will be noted from FIG. 8, the boundaries of the opening 65 are defined by portions of the abutments 60 and 62 which are located to the inside of the axis of rotation of the endmost units 172. Consequently, in some conditions, there is a tendency for the end units 172 to sweep the cut material on around and transversely out the open ends of the cutter bed 64 in front of the upright wall portions 60a and 62a of the abutments 60 and 62. To prevent this from occurring, at least one and preferably both of the end units 172 are provided with specially configured impeller plates 186 located immediately above the carriers 176 and disposed 90° out of phase with such underlying carriers. Each of the impeller plates 186 is elongated, presenting a pair of longitudinally extending, asymmetrical lobes 188 and 190 which are identical to one another but are diametrically opposed to each other and project outwardly from opposite sides of the same axis of rotation. Each of the lobes 188 has a straight trailing edge 190 that extends parallel to the longitudinal axis of the impeller body and terminates in an outermost tip 192 that is located in a retarded position with respect to the longitudinal axis of the impeller body relative to the direction of rotation of the body. Each lobe further includes and arcuate, outwardly bowed leading edge 194 that extends from the tip 192 arcuately forwardly and inwardly to the approximate midpoint of the impeller body where it merges with the trailing edge 190 of the opposite lobe 188. It will be noted that the radius of curvature of the leading edge 194 is approximately the width of the impeller body along its midpoint between the two lobes 188 and that the axis of curvature is located at the approximate intersection of the trailing edge 190 on one lobe and the leading edge 194 on the other lobe.

As a result of this special configuration of the impellers 186 and their out of phase relationship with the underlying carriers 176, loose crop material that has been severed by the end cutting units 172 and their next adjacent inboard cutting units is engaged by the leading edge 194 and directed inwardly toward the center of the opening 65, instead of tending to carry around and out the opposite ends of the cutter bed. Having the leading edges 194 of the impeller plates 186 contoured in the illustrated manner encourages proper release of the severed materials to the opening 65, rather than carry around of such materials.

It will also be noted that each of the end cutting units 172 includes an upright, generally cylindrical impelling cage 196 that helps in directing the severed materials rearwardly and inwardly into the discharge opening 65. As illustrated in FIGS. 2, 7, and 9, each of the impeller cages 196 includes a pair of superimposed, vertically spaced apart flat rings 198 and 200 that are concentric about the axis of rotation of the cutter unit 172. An upper series of upright, circumferentially spaced apart spacer tubes 202 are disposed between the upper ring 200 and the lower ring 198, while a corresponding series of lower, circumferentially spaced, upright spacer tubes 204 are located between the bottom ring 198 and the top surface of the impeller plate 186. The lower tubes 204 are axially aligned with the upper tubes 202 such that long bolts 206 may be extended down through the assembly of tubes and spacers to threadably secure the same and the underlying impeller plate 186 down to a hub or collar 206 located beneath the impeller plate 186 and secured to the underlying carrier 176.

It should be apparent from the foregoing that the harvester 10 provides for center pivot mowing and conditioning, yet a mechanical drive to the operating components of the header 50. As a result of the equal angle relationship illustrated in FIG. 6 at the opposite ends of the telescoping driveline section 106, the tendency to develop rotational speed differentials at opposite ends of the telescoping section 106 is minimized such that untoward loading is avoided and useful operating life is prolonged. Furthermore, the mechanical drive available in the harvester 10 permits the use of rotary cutting devices which may sometimes require the additional driving power through such mechanical drives, such rotary cutter mechanism being particularly desirable in some crop conditions more so than others. Through the use of the specially configured impeller plates 186 on the left and right end cutter units 172, the tendency to unintentionally carry severed crop material around and out the opposite ends of the cutter bed 64 is dramatically reduced. If desired, a number of protective, rubberized curtains 206 (FIG. 2) may be provided about the front and side margins of the header 50. Such curtains 206 hang from a pair of front panels 208 and 210 across the front of the header 50 which are hinged along their rear extremities to permit the panels 208,210 to swing up to access positions. Other curtains along the side margin of the header 50 are supported at the outer extremities of opposite panels 212 and 214, which, likewise, are hinged along their inner margins to permit swinging up into access positions and for narrower roading width.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of their invention as pertains to any apparatus not materially departing from but outside the literal scope of the invention as set out in the following claims.

We claim:

1. In a rotary mowing machine having a horizontal series of rotary cutter units supported for rotation about individual upright axes and disposed to deliver cut crop to a discharge opening behind the units, each of said cutter units including an elongated, generally flat carrier having a pair of knives located at opposite, longitudinal ends thereof, the opposite end units in the series having knives which move laterally inwardly and rearwardly along the inboard extremities of the end units with respect to the path of travel of the machine, the improvement comprising:

at least one of said end units having an impeller plate rotatable therewith in a plane slightly above the plane of the knives for assisting in delivering cut crop to the discharge opening, said impeller plate being elongated and oriented such that its longitudinal axis extends at right angles to the longitudinal axis of the carrier with which it is associated, and being configured to present a pair of diametrically oppositely extending longitudinal lobes, each of said lobes asymmetrical with respect to said longitudinal axis of the plate and presenting an outer-most tip that is in a retarded position with respect to said axis, and having a curved leading edge that leads arcuately outwardly to the tip about an axis of curvature spaced laterally from said longitudinal axis on the trailing side thereof.

2. In a rotary mowing machine as claimed in claim 1, both of said end units having an impeller plate.

3. In a rotary mowing machine as claimed in claim 1, said impeller plate having overall length and width dimensions corresponding at least generally with the carriers.

* * * * *